United States Patent [19]

Wei

[11] Patent Number: 4,955,021
[45] Date of Patent: Sep. 4, 1990

[54] EFFICIENT CONNECTION ARRANGEMENTS FOR MULTIHOP NETWORKS

[75] Inventor: Lee-Fang Wei, Lincroft, N.J.

[73] Assignee: AT&T Bell Laboratories, Murray Hill, N.J.

[21] Appl. No.: 374,895

[22] Filed: Jul. 3, 1989

[51] Int. Cl.⁵ .............................................. H04J 1/00
[52] U.S. Cl. ........................................ 370/124; 375/8
[58] Field of Search .................. 370/124, 85.5, 85.8, 370/69.1, 120; 375/8

[56] References Cited

U.S. PATENT DOCUMENTS

| | | | |
|---|---|---|---|
| 4,365,331 | 12/1982 | Biba et al. | 370/124 |
| 4,434,463 | 2/1984 | Quinquis et al. | 364/200 |
| 4,646,295 | 2/1987 | Basile | 370/124 |
| 4,736,465 | 4/1988 | Bobey et al. | 455/612 |

OTHER PUBLICATIONS

*National Computer Conference*, 1987, "The Sub-LAN Solution to Office Connectivity Needs", C. Peterson, pp. 433–436.

*AT&T Technical Journal*, Nov./Dec. 1987, vol. 66, Issue 6, "Terabit Lightwave Networks: The Multihop Approach", A. S. Acampora et al., pp. 21–34.

*Primary Examiner*—Douglas W. Olms
*Assistant Examiner*—Christopher O. Edwards

[57] ABSTRACT

This invention is a Local Area Network (LAN) which comprises a plurality of NIU's, each arranged to transmit on a separate set of frequencies and to receive on a separate set of frequencies. During operation, a data packet is multihopped from a source NIU, through intermediate NIUs, until reaching an NIU which can transmit a frequency which the destination NIU is capable of receiving. The packet is then forwarded to the destination NIU. The source NIU may also send a control packet and cause the destination NIU to adjust its receive frequency so that subsequent packets may be transmitted directly to the receiving NIU. In an alternative embodiment, the multihopping may be accomplished using specialized headnode modems.

11 Claims, 3 Drawing Sheets

EFFICIENT CONNECTION ARRANGEMENTS FOR MULTIHOP NETWORKS

FIELD OF THE INVENTION

The present invention relates to multihop Local Area Networks (LANs).

DESCRIPTION OF THE PRIOR ART

Lightwave LANs using bus or star architectures suffer from two inefficiencies: (1) high power lightwave components are required to overcome the attenuation caused by other connections to the lightwave bus or star, and (2) lightwave transceivers available with current technology cannot be retuned fast enough to effectively utilize the large bandwidth of lightwave fiber. This second problem arises from the fact that in a Frequency Division Multiplexed (FDM) network, either the receivers must quickly retune to receive the transmissions of different transmitting NIUs, or the transmitters must quickly retune to transmit on the different receive frequencies of various receiving NIUs.

The retuning problem has in some measure been overcome recently by the use of multihop techniques. In this regard, see, for example, the article "Terabit Lightwave Networks: The Multihop Approach" by A. S. Acampora et al., in *AT&T Technical Journal*, Vol. 66, Issue 6, Nov.-Dec. 1987, at pp. 21-34, which teaches a system wherein each lightwave transmitter and receiver is tuned to a separate predetermined set of one or more frequencies, and packets transmitted on one frequency from a source NIU are multihopped through various intermediate NIUs, each intermediate NIU receiving the packet on one frequency and retransmitting it on another frequency, until the packet is received by the destination NIU. Multihopping is efficient for bursty packet traffic because it eliminates the requirement to retune quickly, relative to the transmission rate of the NIUs, but it is inefficient for continuous stream type packetized traffic such as voice, large data files, and video images because each intermediate NIU must retransmit a large amount of data which is not destined for it.

The problem that remains is to provide a network which can efficiently utilize (1) the high bandwidth of lightwave fiber for all types of network traffic, and (2) low power, slowly tunable, lightwave transceivers.

SUMMARY OF THE INVENTION

The foregoing problem in the prior art has been solved in accordance with the present invention which relates to a Local Area Network (LAN) that multihops packets through intermediate NIUs or headnode modems if the traffic is bursty in nature, and uses a control signal to automatically retune the receiving NIU and thereby eliminate the multihopping if the traffic is continuous in nature. Although the primary use of the inventive LAN is in lightwave networks, it is to be understood that the invention is suitable for use with any other transmission medium, such as coaxial cable for example.

An exemplary embodiment of the inventive LAN includes (1) a first tier comprising a plurality of communications subnetworks, each communications subnetwork comprising (i) a small number of NIUs, so as not to cause a power attenuation problem, (ii) a headnode modem for monitoring the communications transmitted by the small number of NIUs, and (2) a second tier comprising a first multihop network, and a second non-multihop network designated a splitter network. The headnode modems of all of the communications subnetworks are networked together via the multihop network, and each headnode modem is arranged to transmit data to the multihop network on a first set of frequencies and to receive data from the multihop network on a second set of frequencies, where these sets of frequencies may be different for different headnode modems in the LAN. Additionally, each headnode modem is arranged to transmit data to the splitter network, which is arranged to distribute data received from each of the headnode modems to all the NIUs on the LAN. During operation, a packet may be multihopped through various headnode modems via the multihop network and then forwarded to its destination NIU via the splitter network or, if the destination NIU is tuned to receive at the proper frequency, the packet may be sent directly from the headnode modem associated with the subnetwork where it originated, to the destination NIU, via the splitter network.

DETAILED DESCRIPTION

Figure 1:
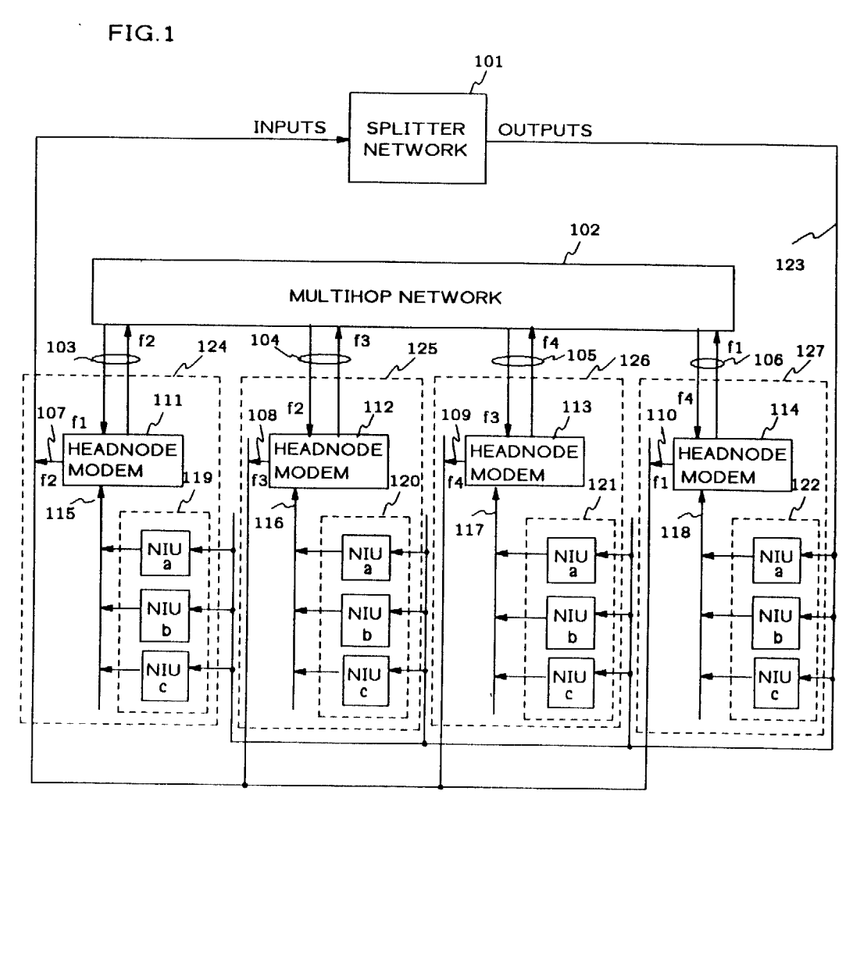
FIG. 1 shows a block diagram of an exemplary implementation of the inventive LAN.

FIG. 1 illustrates an exemplary implementation of the inventive Local Area Network (LAN) including (1) a first tier, comprising four exemplary communications subnetworks 124-127, which are each shown as comprising three Network Interface Units (NIUs), e.g., 119a-119c of subnetwork 124, connected to an associated headnode modem, e.g., 111 of subnetwork 124, via a communications medium, e.g. communications bus 115 of subnetwork 124; and (2) a second tier, including (a) a splitter network 101; and (b) a multihop network 102. This specific embodiment of the inventive LAN is particularly useful for lightwave implementations, where the number of NIUs which can be connected to a single fiber is limited by the attenuation which results from each connection. Briefly, each of the NIUs 119-122 functions to interface one or more users (not shown) with the associated communications subnetwork and with the inventive LAN.

Each of the NIUs 119 through 122 is arranged to transmit data signals via its associated communications medium 115-118, to its associated headnode modem 111-114. Contention among NIUs competing for access to the headnode modem in each of the communications subnetworks may be managed via any standard method known in the art such as Carrier Sense Multiple Access (CSMA), or may be eliminated by the use of a separate communications channel between each of the NIUs of a subnetwork and the associated headnode modem.

Each of the headnode modems 111-114 comprises two input ports, the first of which is connected to the associated communications medium, and two output ports. Each headnode modem is arranged to receive data signals at the first and the second input port and to demodulate the received data signals to recover data packets. The headnode modem then modulates the recovered data packet to a new frequency band, and transmits the modulated data signal selectively to either the first or the second output port. Furthermore, each headnode modem comprises a database, the information from which is used to select the first or the second output port for transmission of the modulated data signal as will be discussed in greater detail hereinafter.

Multihop network 102 comprises a plurality of inputs, each of which is arranged to receive data signals from the second output port of a separate one of headnode modems 111-114, and a plurality of outputs, each of which is arranged to transmit data signals to the second input port of a separate one of headnode modems 111-114. Multihop network 102 is arranged such that the data signals received from the second output port of any headnode modem are distributed to the second input port of other headnode modems 111-114 in the LAN. Multihop network 102 could comprise, for example, an MXM star coupler, where M is the number of headnode modems in the LAN. In this embodiment, each headnode modem would be arranged to transmit data signals to a separate one of the M inputs of the MXM star coupler, and each headnode modem would also be arranged to receive data signals from a separate one of the M outputs of the MXM star coupler. In general, multihop network 102 may be any configuration such that each of a plurality of input signals are supplied to a plurality of outputs.

An exemplary splitter network 101 comprises a plurality of inputs and a plurality of outputs. Each of the inputs to splitter network 101 is arranged to receive data signals from the first output port of a separate one of the headnode modems 111-114, and each of the outputs of splitter network 101 is arranged to transmit data signals to a separate one of NIUs 119-122. In general, splitter network 101 is understood to comprise any arrangement where a data signal received via any one of the associated output links 107-110 from any of headnode modems 111-114, respectively, of the respective four exemplary communications subnetworks 124-127, will be transmitted via one or more output lines 123 from splitter network 101 to all of NIUs 119-122 of the four communications subnetworks 124-127 of the LAN. Splitter network 101 can be implemented, for example, with an MXL star coupler, where M is the number of inputs corresponding to the number of headnode modems of the LAN, and L is the number of outputs corresponding to at least the number of NIUs of the LAN. This implementation is particularly advantageous because the number of inputs to the star coupler is less than the number of outputs. Since each input is split among all the outputs, an optional lightwave amplifier can be employed to help overcome the power problem caused by the splitting and attenuation of each input signal. If the number of inputs and outputs were equal, or if there were less outputs than inputs, an amplifier would be less useful because the total power level at each output of the star coupler would be nearly equal to, if not more than, the total power at each input to the star coupler. Splitter network 101 is configured to distribute the transmissions from the first output of all headnode modems 111-114 in the LAN to each NIU 119-122 in the LAN. Each NIU, however, at any instant in time, is only tuned to demodulate the transmissions of a separate subset of the headnode modems of the LAN, the subset usually including the headnode modem associated with the same communications subnetwork as the NIU itself. The database contained within each headnode modem includes the addresses of the NIUs on the LAN which are tuned to demodulate data signals transmitted by that headnode modem.

For purposes of explanation only, each headnode modem is assumed hereinafter to transmit on a first separate frequency and to receive on a second separate frequency, and each NIU is assumed to receive on one separate frequency at a given time, where two or more NIUs may be tuned to receive on the same frequency. It is to be understood, however, that each headnode modem could be configured to transmit or to receive data signals on a plurality of frequencies, and that each NIU could be configured to demodulate several frequencies, possibly from different headnode modems, simultaneously.

In operation, NIUs 119-122 communicate with each other using either a multihop mode or a fixed mode at any instant in time. More particularly, in the multihop mode, a data signal is transmitted from an NIU onto its associated communications medium at any predetermined frequency. The data signal represents a data packet which comprises an information field and a header, where the header includes a source address corresponding to the NIU where the packet originated, and a destination address corresponding to the NIU where the packet is destined. When the packet is recovered from the data signal by the headnode modem associated with the communications medium, the destination address in the packet header is compared with a list of NIU addresses previously stored in the headnode modem's database. If the destination NIU for the packet is currently tuned to demodulate the transmitting frequency of the headnode modem, then the destination address from the packet header will match one of the addresses in the headnode modem's database. If a match is found, the packet is modulated to produce a data signal, and the data signal is transmitted to splitter network 101 via the appropriate one of links 107-110 and distributed to NIUs 119-122 via links 123. The NIUs which are tuned to the proper frequency all demodulate the signal and compare the destination address from the packet header to their own respective addresses, and all of the NIUs except the destination NIU will discard the packet. The destination NIU will then process the packet and send it to the proper LAN user equipment (not shown).

If the destination address in the packet header does not match any of the addresses contained within the database of the headnode modem, then the destination NIU is not currently tuned to receive the transmit frequency band of the headnode modem. In this case, the headnode modem will modulate the packet to produce a modulated data signal and will transmit the modulated data signal to another headnode modem, which has a different transmitting frequency band, by means of multihop network 102. The process will continue with each intermediate headnode modem receiving the signal in one frequency band from multihop network 102, comparing its own list of addresses from its database to the destination address in the header of the recovered packet, and, if no match is found, modulating the data packet and transmitting the modulated data signal to another headnode modem in a new frequency band by means of multihop network 102. When the packet reaches a headnode modem which can transmit in the receive frequency band of the destination NIU, one of the addresses in that headnode modem's database will match the destination address in the packet header, and that headnode modem will then modulate the packet and transmit the modulated data signal to splitter network 101 for distribution to the NIUs in the network. The NIUs that are tuned to demodulate the data signal will all do so, and all except the destination NIU will discard the recovered packet. Usually, the headnode modem which can transmit in the receive frequency band of the destination NIU will be the one associated with the same communications subnetwork as the destination NIU.

As an example of the operation of the network of FIG. 1, consider the transmission of a packet from NIU 119b to NIU 121c. For the purpose of this example, NIU 121c is assumed to be tuned to receive on frequency f4, the frequency headnode modem 113 uses when transmitting either to splitter network 101 or to multihop network 102. It should be noted that in the more general case, the frequencies used by each headnode modem to interface to the multihop network may be different from those used to interface to the splitter network. Source NIU 119b outputs a data signal representing a packet onto communications medium 115 of communications subnetwork 124. Headnode modem 111 receives the signal from communications medium 115, recovers the data packet, compares the destination address in the packet header to each address stored in the database at headnode modem 111, and determines that since the address of NIU 121c is not in the database, then the receive frequency for destination NIU 121c is not f2, the transmitting frequency of headnode modem 111 to splitter network 101. Therefore, headnode modem 111 modulates the data packet to frequency f2 and transmits the modulated data signal to multihop network 102 by means of communications link 103. The signal is then supplied to all the headnode modems by means of communications links 103-106. However, only headnode modem 112 is configured to demodulate frequency f2 and thus only headnode modem 112 actually demodulates the data signal and recovers the packet. The destination address in the packet header is compared to the database of headnode modem 112, and since no match is found, a determination is made that destination NIU 121c is tuned not to receive transmissions from headnode modem 112, which transmits at frequency f3 to splitter network 101. Therefore, the packet is modulated to frequency f3 and the modulated data signal is transmitted to multihop network 102 by means of communications link 104 where it is supplied to all headnode modems 111-114, with headnode modem 113 being the only one configured to demodulate the proper frequency f3 as shown in FIG. 1. Headnode modem 113 demodulates the signal, compares the destination address in the recovered packet header to addresses previously stored in the database of headnode modem 113, and since one of the addresses in the database matches the destination address in the packet header, determines that destination NIU 121c is configured to receive on frequency f4, the transmitting frequency of headnode modem 113 to splitter network 101. Therefore, headnode modem 113 modulates the packet to frequency f4 and transmits the modulated data signal to splitter network 101 by means of link 109, where splitter network 101 supplies the packet to all the NIUs in the LAN. Several NIUs in the LAN may be tuned to f4 and each of them would demodulate the signal and examine the destination address in the packet header. NIU 121c, its own address matching the destination address in the packet header, will output the packet to its associated user equipment (not shown), while all the other NIUs tuned to f4 will discard the packet.

The multihop communications mode described above is best utilized when an NIU is receiving traffic of a bursty nature from various NIUs which are associated with various communications subnetworks. This is because the multihop mode eliminates the need for a receiving NIU to retune quickly to the transmitting frequency of the various headnode modems 111-114 of the different communications subnetworks 124-127, a time consuming task which would require expensive, fast tunable, lightwave receivers. However, if a destination NIU is to receive a large data file, video image, or voice signal, all of which are continuous in nature rather than bursty, the multihop mode is not efficient because, to multihop long streams of continuous traffic would require that all of the intermediate headnode modems process a large amount of data which is not destined for them. For this reason, fixed mode communications is made available in the LAN.

A first NIU, designated the source NIU, may set up a fixed mode communications link with a second NIU, designated the destination NIU, by first using the multihop mode described above to send a control packet to the destination NIU. The control packet, similar in structure to the packet previously described, contains data which identifies the packet as a control packet and which identifies the transmitting frequency of the headnode modem associated with the same communications subnetwork as the source NIU. This control packet, when received at the destination NIU, causes the destination NIU to tune its receiver to the transmitting frequency of the source NIU's associated headnode modem, as specified in the control packet. After retuning its receiver, the destination NIU transmits an acknowledgment control packet to the headnode modem which transmits on the new receiving frequency of the destination NIU, the acknowledgment control packet being similar in structure to the control packet previously described. This causes the headnode modem to update its associated database to reflect the new receiving frequency of the destination NIU. This acknowledgment control packet is also forwarded via multihop network 102 to the headnode which the destination NIU was previously tuned to. Upon receipt of the acknowledgment control packet, the headnode modem which the destination NIU was previously tuned to also updates its database to delete the address of the destination NIU. None of the other headnode modems in the system are affected by this acknowledgment control packet. Thereafter, data signals are transmitted from the source NIU to its associated headnode modem, which modulates the recovered data packets and transmits the modulated signal to splitter network 101 for distribution to the destination NIU. It should be noted that it is important to update the headnode modem which transmits on the destination NIU's new receive frequency first, in order to avoid packet loss during the retuning period.

In order to illustrate the operation of the system in the fixed mode, the following example is given for fixed mode communications between NIU 120c and NIU 122b, assuming that NIU 122b is currently tuned to f1. NIU 120c transmits a control packet to headnode modem 112 by means of communications medium 116. The control packet is routed via multihop network 102 from headnode modem 112 to headnode modem 113, from headnode modem 113 to headnode modem 114, and finally, via splitter network 101, from headnode modem 114 to NIU 122b, all by means of the multihop mode previously described. NIU 122b, upon receiving the control packet, retunes its receiver to frequency f3, the transmitting frequency of headnode modem 112. NIU 122b then transmits an acknowledgment control packet onto its associated communications medium 118. The acknowledgment control packet is received by headnode modem 112 through the multihop network, and headnode modem 112 then updates its database to reflect the fact that NIU 122b is tuned not to receive at frequency f1 as it normally would be, but rather it is tuned to receive at frequency f3. Furthermore, this acknowledgment control packet is relayed by means of multihop network 102 through headnode modem 113 to headnode modem 114, which updates its database to reflect the fact that NIU 122b is now tuned to f3, the transmitting frequency of headnode modem 112. Fixed mode communications between NIU 120c and NIU 122b is now effected in the following manner. First, a packet is transmitted from NIU 120c onto communications medium 116 where it is received by headnode modem 112. Headnode modem 112, after checking its database and determining that destination NIU 122b is tuned to receive at frequency f3, the transmitting frequency of headnode modem 112 to splitter network 101, modulates the packet to frequency f3 and transmits the signal directly to splitter network 101 by means of communications link 108, where it is distributed to all the NIUs in the LAN. All NIUs in the LAN that are tuned to frequency f3 and will demodulate the signal, but all except NIU 122b will discard the recovered packet after examining the destination address in the header. Streams of packets could then be transmitted from NIU 120c to NIU 122b in a similar manner, each packet being modulated by headnode modem 112, and the modulated signal being routed directly to splitter network 101 by means of communications link 108, and from splitter network 101 to destination NIU 122b, without any multihopping.

The final packet transmitted from NIU 120c to NIU 122b would be a control packet which would cause NIU 122b to retune its receive frequency to the transmit frequency of headnode modem 114. NIU 122b would then transmit an acknowledgment control packet to headnode modem 114, by means of communications medium 118. Headnode modem 114 would receive the acknowledgment control packet and update its database to reflect the proper receive frequency f1 of NIU 122b. Furthermore, the acknowledgment control packet would be transmitted from headnode modem 114 to headnode modem 112, by means of multihop network 102, and headnode modem 112 would then update its database to reflect NIU 122b being tuned to receive frequency f1.

During the fixed mode communications, if an NIU other than NIU 120c concurrently transmitted packets to NIU 122b, they would still be received by NIU 122b. For example, if NIU 119c transmitted a packet to 122b during the time that NIU 120c and 122b were performing fixed mode communications, the packet from NIU 119c would be multihopped through the headnode modems as described above until reaching headnode modem 112, where it would be forwarded to splitter network 101 for distribution to NIU 122b.

Figure 2:
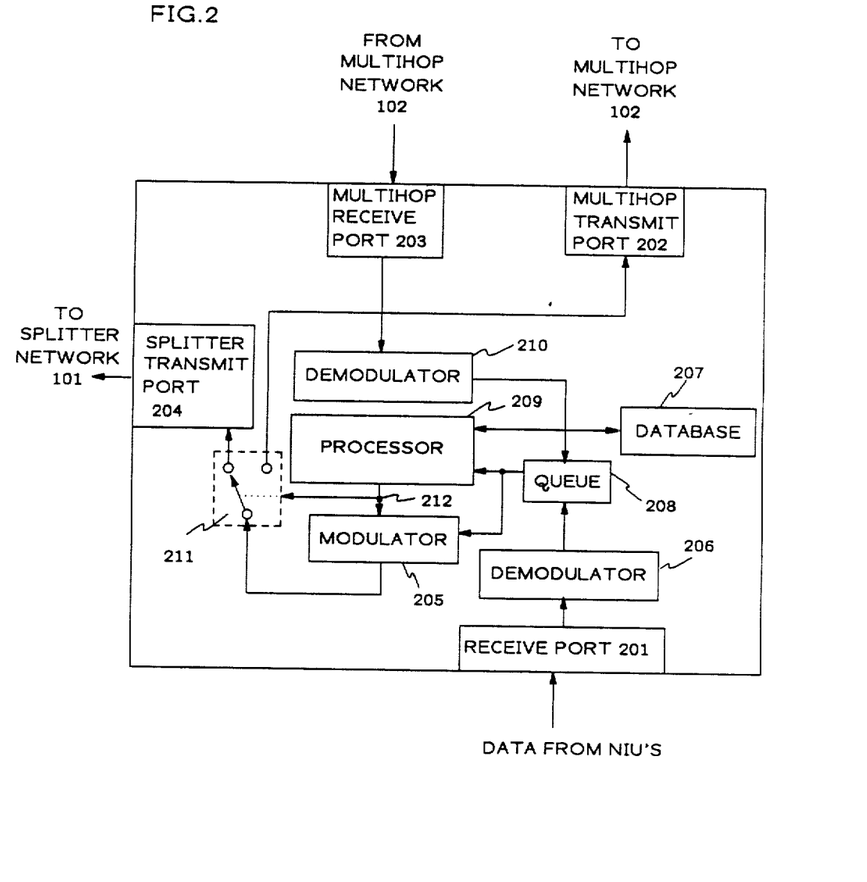
FIG. 2 shows a block diagram of an exemplary headnode modem.

FIG. 2 shows a block diagram of an exemplary implementation of one of headnode modems 111–114. Data signals are received at a first input port 201 from the associated communications medium and at a second input port 203 from multihop network 102. Data signals received at port 201 are demodulated by demodulator 206, and data signals received at receive port 203 which fall within a predetermined frequency band are demodulated by demodulator 210. The output from each demodulator is supplied to queue 208, which serves to resolve contention by the outputs of demodulators 210 and 206 for simultaneous access to processor 209. Queue 208 outputs one recovered data packet at a time to processor 209 and to modulator 205 simultaneously. Processor 209 compares the address in the header of the recovered data packet to a list of addresses previously stored in database 207, and generates a single output 212 based upon the result of the comparison. This single control output 212 is supplied to modulator 205 and to switch 211 where it causes (a) switch 211 to select either splitter transmit port 204 or multihop transmit port 202 for transmission of the modulated signal, and (b) modulator 205 to modulate the data packet previously received from queue 208 to whichever port has been selected by switch 211. If the headnode modem was capable of transmitting at more than one frequency, processor 209 would select which frequency is to be used, and output 212 would supply modem 205 with the information necessary to select the proper transmit frequency. More generally, each headnode modem could contain several modems and several queues, and the modems could operate simultaneously, possibly increasing efficiency. It should be noted that after a headnode modem transmits a control packet to an NIU which informs the NIU to change its receive frequency, the headnode modem will need to hold future packets destined for that NIU until the headnode modem receives acknowledgement that the receive frequency has been changed. This is easily implemented, and will avoid packets being lost while an NIU is adjusting its receive frequency.

In another embodiment of the invention, each headnode modem may be implemented to store the receive frequencies of only the NIUs connected to the same subnetwork as the headnode modem itself, regardless of other NIUs on other subnetworks which may also be tuned to demodulate the headnode modem's transmitting frequency. In this case, the protocol for setting up a fixed mode communications link would be slightly different. A source NIU desiring to set up fixed mode communications link would send a control packet to the destination NIU as previously described. The destination NIU, rather than updating its frequency immediately, would send a second control packet, designated a request packet, to the headnode modem connected to the same subnetwork as the NIU, which would inform the headnode modem of the destination NIU's need to change frequencies. The headnode modem would then send an acknowledgment packet back to the destination NIU by means of splitter network 101, and the acknowledgment packet would actually cause the destination NIU to change its frequency. After retuning its frequency, the destination NIU would send out another control packet which informs both the headnode modem associated with the destination subnetwork as well as the source NIU of the destination NIU's new receiving frequency. The source NIU would then begin transmitting packets to its associated headnode modem, which has no record of the new frequency of the destination NIU. The source NIU would, however, include in each packet a flag bit which would inform the headnode modem associated with the source subnetwork that the particular packet is to be transmitted to the splitter network, rather than the multihop network. NIUs other than the source NIU may also communicate, via multihop mode, with the destination NIU. Packets from these subnetworks would be multihopped by their respective headnode modems until reaching the headnode modem associated with the same communications subnetwork as the destination NIU. Since the destination NIU is in fixed mode, it will not be able to receive transmissions from its own headnode modem. Therefore, its own headnode modem will modify a select bit in the packet header and use the multihop network to forward the modified packet to the headnode modem which is transmitting on the proper frequency. This modified select bit would inform the other headnode modem which is transmitting on the proper frequency to transmit the packet to the splitter network, even though the headnode modem transmitting on the proper receiving frequency of the destination NIU would have no record that the destination NIU is tuned to receive that particular frequency.

This implementation has some slight advantages, in that each headnode modem need only check the flag bit or the select bit to determine whether the packet is to be transmitted to the multihop or the splitter network, rather than comparing the address in the packet to a whole list of addresses. Also, the size of the database in each headnode modem is fixed, including only the receive frequencies of its own associated NIUs, allowing the required amount of storage to be accurately predicted. Further, note that any packet received at a headnode modem which is destined for an NIU associated with a different subnetwork and which is to be transmitted to the multihop network is always going to be sent through the multihop network to the headnode modem connected to the same subnetwork as the destination NIU. This property would help in the implementation of an efficient routing algorithm for the multihop network, if such an algorithm was desired.

Figure 3:
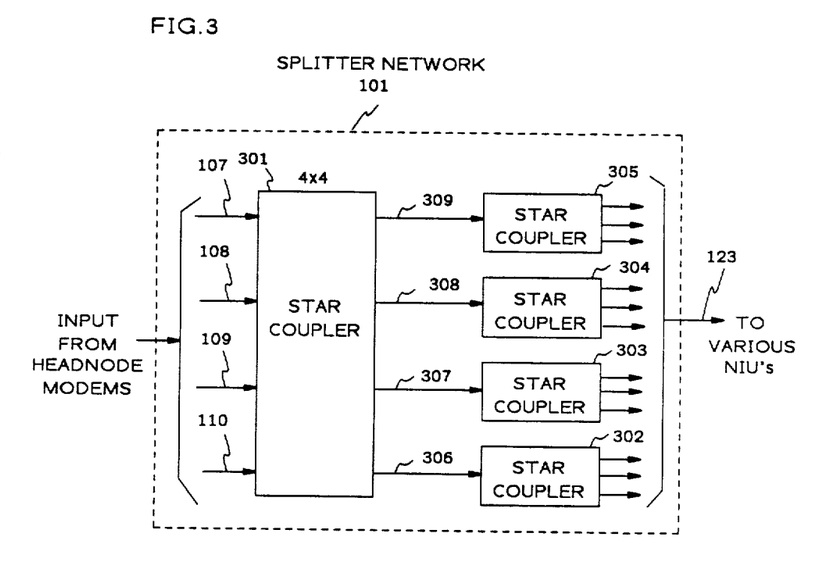
FIG. 3 shows a block diagram of an exemplary implementation of a splitter network.

FIG. 3 shows an exemplary implementation of splitter network 101, utilizing a plurality of star couplers 301-305. In this case, an exemplary 4×4 star coupler 301 has each of its four outputs 306-309 connected to the input of a separate one of subordinate star couplers 302-305. Each of the subordinate star couplers 302-305 would then further split the input signal and supply a separate portion of this input signal to all of the NIUs associated with a particular communications subnetwork.

Figure 4:
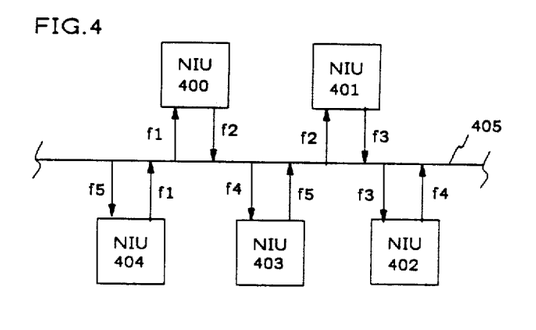
FIG. 4 shows a generalized example of the inventive network.

FIG. 4 shows a more generalized implementation of the inventive LAN without the use of the headnode modems, or the splitter network. Communications medium 405 functions as the multihop network. Each NIU 400-404 transmits on a separate predetermined set of one or more frequencies and receives on a separate predetermined set of one or more frequencies. For purposes of explanation, each NIU is assumed to receive on a separate first frequency and to transmit on a separate second frequency, as shown in FIG. 4. If an NIU has bursty packet traffic to transmit to other NIUs, the packet is multihopped through one or more intermediate NIUs, as is described for the headnode modems above. However, if an NIU has stream type traffic to transmit to another NIU, the fixed mode of communications would be invoked. A control packet would be sent to the receiving NIU using multihop mode, which would cause the receiving NIU to retune its receiver from its previous receive frequency, to the transmitting NIU's transmit frequency. An acknowledgement control packet would be transmitted by the receiving NIU which would cause the transmitting NIU's database to be updated, as described above for the headnode modems. Thereafter, traffic from the source NIU would be routed directly to the destination NIU. It should be noted that in the network of FIG. 4, high powered laser transmitters are required at each NIU if the network is implemented with lightwave technology, since the transmissions of each NIU must reach all other NIUs. However, in the network of FIG. 1, only the headnode modems need high powered transmitters since the NIUs in FIG. 1 need only enough power to reach their own headnode modem.

It is to be understood that the examples given herein are for illustrative purposes only and that other variations are possible without violating the scope and spirit of the invention. For example, the headnode modems may each be capable of transmitting and receiving on a plurality of frequencies, and multihop network 102 may contain any efficient routing algorithm, many of which are well known in the art. Further, the output port to which the headnode modem transmits and the set of frequencies which an NIU tunes to receive can be determined based on any prescribed criteria, rather than just the traffic type. The communications media 115-118 could be replaced with star networks or other suitable architectures, so long as it will provide a medium and a protocol for a plurality of NIUs to send messages to a headnode modem. The multihop or splitter networks need not be implemented as star couplers, but could be implemented, for example, with a communications bus, and the network could be implemented all or in part by using any combination of electrical or lightwave circuits or medium. The multihop or splitter network may even be implemented as one physical network, separated logically through the use of a multiplexing scheme.

I claim:

1. A communications network comprising (i) at least one communications media, and (ii) a plurality of NIUs, each NIU being arranged to receive data from at least one of the communications media on a first separate set of one or more frequencies and to transmit data onto at least one of the communications media on a second separate set of one or more frequencies and to add frequencies to, or subtract frequencies from, the first set of frequencies, and wherein data, transmitted from an NIU on a transmitting frequency which is not included in the first set of frequencies of an NIU to which the data is destined, is transmitted through one or more intermediate NIUs until reaching an intermediate NIU which transmits the data on a frequency which is included in the first set of frequencies of the NIU to which the data is destined.

2. A communications network comprising:
a plurality of communications subnetworks, each subnetwork including:
a plurality of Network Interface Units (NIUs), each NIU being arranged (i) for receiving data or control signals from both one or more end users of the network and in a specified frequency band from the communications network, and (ii) for transmitting data or control signals to the communications network or back to the one or more end users; and
a headnode modem comprising:

(a) means for receiving data or control signals from (i) the NIUs of the subnetwork, and (ii) from a separate subset of the headnode modems of other communications subnetworks, (b) means for determining if a received data or control signal is to be transmitted to at least one of a predetermined subset of NIUs; and (c) means for modulating and transmitting the received data or control signals (i) which are to be transmitted to at least one of the predetermined subset of NIUs to a first output port, and (ii) which are not to be transmitted to at least one of the predetermined subset of NIUs to a second output port, and at a predetermined frequency band chosen from a set of one or more specific frequency bands assigned to the headnode modem, and a multihop network comprising means for receiving modulated data or control signals from the second output port of each headnode modem and transmitting the modulated data or control signals to the second input port of each headnode modem; and a splitter network, comprising means for receiving data or control signals from the first output port of each headnode modem and transmitting the received modulated data and control signals to each NIU of the plurality of communication subnetworks.

3. A communications network according to claim 2 wherein each NIU comprises:

(a) an input port, (b) an output port, arranged to transmit data and control signals to the headnode modem by means of a communications medium, (c) means for demodulating data and control signals received at the input port in any frequency band of a predetermined set of one or more frequency bands and for adding frequencies to, or subtracting frequencies from, the set of one or more frequency bands in response to a control signal received at the input port, and (d) means for transmitting data and control signals from one or more end users of the communications network to the output port for transmission over the communications medium.

4. A communications network according to claim 3 wherein each of the headnode modems further comprises:

means for storing information relating to the demodulating means in one or more NIUs, means for comparing the stored information relating to the demodulating means in the NIUs to a predetermined portion of a recovered data packet to determine if the recovered data packet is to be transmitted to at least one of the predetermined subset of NIUs, and means for updating the previously stored information based upon a control signal received from either an NIU or other headnode modem.

5. A communications network according to claim 2 wherein each of the headnode modems further comprises:

means for storing information relating to the demodulating means in at least one NIU, means for comparing the stored information relating to the demodulating means in the NIU to a predetermined portion of a recovered data packet to determine if the recovered data packet is to be transmitted to at least one of the predetermined subset of NIUs, and means for updating the previously stored information based upon a control signal received from either an NIU or other headnode modem.

6. A communications network according to claims 2, 3, 4, or 5 wherein each subnetwork further comprises a communications medium which includes at least one waveguide capable of supporting a lightwave signal for interconnecting the plurality of NIUs with the headnode modem, and each NIU is capable of transmitting a lightwave signal onto at least one of the at least one waveguide capable of supporting a lightwave signal.

7. A communications network according to claims 2, 3, 4, or 5 wherein at least one NIU is capable of receiving a lightwave signal.

8. A communications network according to claims 2, 3, 4, or 5 wherein the multihop network comprises at least one lightwave star coupler.

9. A communications network according to claims 2, 3, 4, or 5 wherein the splitter network comprises at least one lightwave star coupler.

10. A method of transmitting data from a source Network Interface Unit (NIU), arranged to transmit data on a first set of one or more frequencies, to a destination (NIU), arranged to receive on a second set of one or more frequencies, where the first and second set may comprise the same or different frequencies, comprising the steps of:

(a) determining whether data is to be transmitted to at least one of a predetermined subset of NIUs;

(b) if not, determining that the first set and the second set are mutually exclusive, and adding at least one frequency to the second set of one or more frequencies which the destination NIU is tuned to receive on to include at least one frequency included in the first set of frequencies;

(c) transmitting the data on a predetermined frequency, chosen from the first set of one or more frequencies, whether or not the data is to be transmitted to at least one of the predetermined subset of NIUs.

11. A method of providing communications in a communications network comprising (1) a plurality of communications subnetworks, each communications subnetwork comprising a plurality of Network Interface Units (NIUs), disposed between end users of the communications network, and a headnode modem associated with the communications subnetwork, (2) a multihop network for interconnecting the headnode modems of all communications subnetworks, and (3) a splitter network for interconnecting the headnode modems with the NIUs of all the communications subnetworks, the method comprising the steps of:

(a) transmitting data or control signals received by an NIU from an end user to the headnode modem of the same communications subnetwork;

(b) determining at the headnode modem if a received data or control signal is to be transmitted to at least one of a subset of predetermined NIUs;

(c) transmitting the data or control signal to the multihop network in a first selectively assigned frequency band receivable by only a specified subset of other headnode modems in other communications subnetworks when the data or control signal is not to be transmitted to at least one of the predetermined subset of NIUs, and transmitting the data or control signal to the splitter network in a selectively assigned second specified frequency band, which is receivable by the predetermined subset of NIUs of the communications network, for distribution to all NIUs of each of the communications subnetworks when the data or control signal; is to be transmitted to at least one of the predetermined subset of NIUs, (d) receiving the data or control signal from the splitter network in the second predetermined frequency band at each NIU, and only the NIU associated with an end user destined to receive the data or control signal, transmitting the data or control signal to the destined end user; and (e) reiterating steps (b), (c), and (d) for a data or control signal received by a headnode modem from the multihop network.

* * * * *